(12) United States Patent
Frenkel et al.

(10) Patent No.: US 7,514,485 B2
(45) Date of Patent: Apr. 7, 2009

(54) COMPATIBILIZERS FOR COMPOSITES OF PVC AND CELLULOSIC MATERIALS

(75) Inventors: Peter Frenkel, Danbury, CT (US); Edward Krainer, New Fairfield, CT (US)

(73) Assignee: Chemtura Corporation, Middlebury, CT (US)

( * ) Notice: Subject to any disclaimer, the term of this patent is extended or adjusted under 35 U.S.C. 154(b) by 414 days.

(21) Appl. No.: 11/473,262

(22) Filed: Jun. 20, 2006

(65) Prior Publication Data

US 2007/0293604 A1    Dec. 20, 2007

(51) Int. Cl.
*B29C 47/00* (2006.01)

(52) U.S. Cl. .................. 524/13; 524/148; 524/174; 524/567

(58) Field of Classification Search ............ 524/13, 524/148, 174, 567
See application file for complete search history.

(56) References Cited

U.S. PATENT DOCUMENTS

| | | | |
|---|---|---|---|
| 5,514,734 | A | 5/1996 | Maxfield et al. |
| 5,599,530 | A | 2/1997 | Patil et al. |
| 5,707,571 | A | 1/1998 | Reedy |
| 6,531,533 | B1 | 3/2003 | Kuhn et al. |
| 6,911,077 | B2 | 6/2005 | Zucker |
| 2006/0036004 | A1 * | 2/2006 | Wu et al. ............ 524/13 |

FOREIGN PATENT DOCUMENTS

JP    08295774-1996    11/1996

WO    WO 2004/028994    4/2004

OTHER PUBLICATIONS

C. Bloyaert, "PVC, the Definitive Choice for Sustainable Natural Fiber Composites," The 9th International PVC Conference (Brighton, U.K., 2005).
B.L. Shah et al., "Novel Coupling Agents for PVC/Wood-Flour Composites," ANTEC 2005, USA.
H. Jiang et al., "Development of PVC/Wood Composites: A Literature Review," 10 J. Vinyl Addit. Technol. 59 (2004).
Q. Li and L.M. Matuana, "Surface of Cellulosic Materials Modified with Functionalized Polyethylene Coupling Agents," 88 J. Appl. Polym. Sci. 278-86 (2003).
F.M. Meneloglu et al., "Effects of Impact Modifiers on the Properties of Rigid PVC/Wood-fiber Composites," 6(2) J. Vinyl Addit. Technol. 153 (2000).
32(1) Wood and Fiber Science 88-104 (Jan. 2000).
L.M. Matuana et al.., "Influence of Interfacial Interactions on the Properties of PVC/Cellulosic Fiber Composites," 19(4) Polymer Composites 446-55 (Aug. 1998).
22 Plastics, Rubber and Composites Processing and Applications 79-89 (1994).
B.V. Kokta et al., "Composites of Polyvinyl Chloride-wood Fibers--III: Effect of Silane as Coupling Agent," 12(3) J. Vinyl Tech. 146-53 (Sep. 1990).
11 Intern. J. Polymeric Mater. 9-38 (1985).

* cited by examiner

*Primary Examiner*—Peter D Mulcahy
(74) *Attorney, Agent, or Firm*—James Sher

(57) ABSTRACT

Disclosed herein is a method for improving the physical properties of cellulose fiber-containing material/PVC composites comprising adding to said composites an effective amount of at least one compatibilizer comprising an organometallic zirconium compound. The preferred organometallic zirconium compound is cyclo[dineopentyl(diallyl)]pyrophosphato dineopentyl(diallyl)zirconate. Articles of manufacture comprising such composites are also disclosed.

25 Claims, No Drawings

COMPATIBILIZERS FOR COMPOSITES OF PVC AND CELLULOSIC MATERIALS

BACKGROUND OF THE INVENTION

1. Field of the Invention

This invention relates to the field of additives, and, more specifically, to compatibilizers for composites of poly(vinyl chloride) (PVC) and cellulosic materials used as building materials for decking, railing, window profiles, roofing shingles, fencing, siding, furniture, and the like.

2. Description of Related Art

Composites of PVC with wood and other cellulosic fibers combine the particular properties of PVC, such as high rigidity, weatherability, low flammability (PVC is a self-extinguishing material), moisture resistance, low brittleness, and low density, and those of wood or other natural fibers (low price, esthetic appeal), in such a way that a new material with desirable qualities is obtained (See C. Bloyaert, *PVC, the Definitive Choice for Sustainable Natural Fiber Composites*, THE 9TH INTERNATIONAL PVC CONFERENCE (Brighton, U.K., 2005), and H. Jiang et al., *Development of PVC/Wood Composites: A Literature Review*, 10 J. VINYL ADDIT. TECHNOL. 59 (2004), and references cited therein.) Applications for wood-PVC include decking, railing, fencing, window profiles, doors, and flooring.

Wood-PVC composites have higher flexural modulus than PVC alone (see Bloyaert and Jiang et al., supra). Flexural strength, however, is lower than that for PVC (see Jiang et al., supra, and F. M. Meneloglu et al., 6 J. VINYL ADDIT. TECHNOL. 153 (2000)).

Improvement of mechanical properties is always desirable for composite materials, and it will lead to more durable materials that will also require less maintenance. The properties can be improved by the use of a compatibilizer. Possible approaches to improving mechanical properties by increasing adhesion between wood or cellulose and PVC include sizing (of wood or cellulose) and compatibilization. "Sizing" is the treatment of the fibers prior to their incorporation into the compound; "compatibilization" refers to an additive (compatibilizer) blended into the compound in order to enhance the mechanical properties of the final product. Wood sizing agents for wood-PVC that have been described include: silanes, silane/peroxide blends, polyisocyanates, mercaptans, maleic anhydride and phthalic anhydride with peroxides, maleated polypropylene/benzoyl peroxide, metallic complexes, such as chromated copper arsenate or copper ethanolamine, grafting acrylonitrile on wood flour (see Jiang et al., supra). Other materials reported as coupling agents include: chitin and chitosan (see B. L. SHAH ET AL., NOVEL COUPLING AGENTS FOR PVC/WOOD-FLOUR COMPOSITES, ANTEC 2005, USA), acrylic acid-functionalized polyethylene (PE) and maleic anhydride-functionalized PE (see Q. Li and L. M. Matuana, *Surface of Cellulosic Materials Modified with Functionalized Polyethylene Coupling Agents*, 88 J. APPL. POLYM. SCI. 278-86 (2003)), phthalic anhydride, maleic anhydride, and linoleic acid (Jiang et al., supra).

There are numerous publications on the use of alkoxy derivatives of silica (organo silanes) as sizing/coupling agents in plastics composites. The silanes, such as 3-aminopropyl triethoxysilane, and aluminates are typical materials of that sort (JP 08295774-1996; 32(1) WOOD AND FIBER SCIENCE 88-104 (January 2000); B. V. Kokta et al., *Composites of Polyvinyl Chloride-wood Fibers III. Effect of Silane as Coupling Agent*, 12(3) J. VINYL TECH. 146-53 (September 1990); Jiang et al., supra; L. M. Matuana, *Influence of Interfacial Interactions on the Properties of PVC/Cellulocis Fiber Composites*, 19(4) POLYMER COMPOSITES 446-55 (August 1998). Alkoxy derivatives of titanium (organo titanates) are also known as compatibilizers in the similar composite systems. Examples include titanium di(dioctylpyrophosphate)oxyacetate (11 INTERN. J. POLYMERIC MATER. 9-38 (1985). Alkoxy derivatives of zirconium (organo zirconates), such as cyclo [dineopentyl(diallyl)]pyrophosphato dineopentyl(diallyl)zirconate (also known as KZ TPP), as well as compounds of Ti, Si, and Al, are mentioned in literature as compatibilizers in a plastic fiber reinforced cementitious materials (WO 2004/028994) and in PVC filled with rubber dust (22 PLASTICS, RUBBER AND COMPOSITES PROCESSING AND APPLICATIONS 79-89 (1994)).

U.S. Pat. No. 5,514,734 discloses a process of forming a composite material comprising a polymer matrix comprising a polymeric material and dispersed particles selected from the group consisting of platelet or fibrillar particles having average thicknesses of less than 50 A and a maximum thickness of less than about 100 A and fibrils having an average diameter equal to or less than about 200 A and a maximum diameter of about 200 A and having an organo metallic species covalently bonded to said particles of organo metallic, and the organo metallic species having a moiety which is compatible with a polymer species in the polymer matrix, or said organo metallic species having a moiety which is covalently bonded to a polymer species in the polymer matrix or a combination thereof, said dispersed particles being present in an amount less than about 60% by weight of the composite material and to the composite material formed by such process.

U.S. Pat. No. 5,599,530 discloses an organic pigment particle having chemically bonded to its surface an organometallic zirconium compound, cosmetic compositions containing the pigment particles, and a method for reducing the staining potential of organic pigments.

U.S. Pat. No. 5,707,571 discloses a fiber reinforced, thermoplastic foam produced by dispersing fibers of controlled dimensions and blowing agent in molten thermoplastic and extruding the mixture with high back pressures. As the blowing agent expands, the fibers become randomly oriented and a fine cellular structure is formed in the plastic which freezes the fibers in a random spatial orientation.

U.S. Pat. No. 6,911,077 discloses a fiber reinforced cementitious material and the fiber used therein. The fiber reinforced cementitious material includes a conventional cementitious material and less than five pounds per cubic yard of the cementitious material of fibers dispersed therein. The fibers are made of a mixture of a thermoplastic polymer and an organometal compound wherein the metal of the compound is selected from the group consisting of Ti, Si, Zr, Al, and combinations thereof, with the organometal compound comprising less than 10% by weight of said fibers.

The disclosures of the foregoing are incorporated herein by reference in their entirety.

SUMMARY OF THE INVENTION

According to the current invention, an organometallic zirconium compound is used as a compatibilizer for cellulose fiber-PVC (which term is intended to include wood-PVC) composites. Specifically, the present invention relates to the use of an organozirconate compatibilizer or coupling agent to improve the flexural properties, such as flexural modulus and strength, of cellulose fiber-containing PVC composites. Such cellulose fiber-containing materials can include, but are not limited to, cellulose, cellulose derivatives, wood fibers, wood flour, flax, kenaf, sisal, jute, rice hulls, cotton, hemp, and the like. Preferred cellulose fiber-containing materials are selected from the group consisting of wood flour, wood fiber, and natural fibers, such as flax, rice hulls, sisal, jute, and kenaf. Preferably, the compatibilizer is used at a level of from about 0.1 to about 90 phr, more specifically from about 1.0 to about 15.0 phr.

More particularly, the present invention is directed to a method for improving the physical properties of cellulose fiber-containing material/PVC composites comprising adding to said composites an effective amount of at least one compatibilizer comprising an organometallic zirconium compound.

In another aspect, the present invention is directed to a composition comprising a cellulose fiber-containing material/PVC composite and at least one compatibilizer comprising an organometallic zirconium compound.

In still another aspect, the present invention is directed to an article of manufacture comprising a composition comprising a cellulose fiber-containing material/PVC composite and at least one compatibilizer comprising an organometallic zirconium compound.

DESCRIPTION OF THE PREFERRED EMBODIMENT(S)

As noted above, the present invention is directed to a method for improving the flexural properties of cellulose fiber-PVC composites comprising adding to said composites an effective amount of at least one compatibilizer comprising an organometallic zirconium compound, e.g., an organozirconate.

The term "organo-metallic" means an organo-metallic compound wherein the metal has an oxidation state of one to eight. The organometallic compounds in accordance with the invention are derived from zirconium.

Organo-metallic zirconium compounds suitable in accordance with the invention include:

cyclo[dineopentyl(diallyl)]pyrophosphato dineopentyl(diallyl)zirconate (also known as cyclo[bis-(2,2-diallyoxymethyl)butylpyrophosphato bis-(2,2-diallyloxymethyl)butyl zirconate, also known as Zirconium IV di[2,2-(bis2-propenoclatomethyl)butanolato]cyclodi[2,2-(bis2-propenoclatomethyl)butanolato]pyrophsophato-O,O, (CAS # 121543-39-3)), cyclo(dioctyl)pyrophosphato dioctyl zirconate, cycloneopentyl cyclo(dimethylaminoethyl)pyrophosphate zirconate dimesyl salt, tetra(2,2diallyloxymethyl)butyl di(ditridecyl)phosphito zirconate, neopentyl(diallyl)oxytrineodecanoyl zirconate, neopentyl(diallyl)oxytri(dodecyl)benzene sulfonyl zirconate, neopentyl(diallyl)oxytri(dioctyl)phosphato zirconate, neopentyl(diallyl)oxytri(dioctyl)pyrophosphato zirconate, neopentyl(diallyl)oxytri(N-ethylenediamino)ethyl zirconate, neopentyl(diallyl)oxytri-(m-amino)phenyl zirconate, neopentyl(diallyl)oxytrimethylacryl zirconate, neopentyl(diallyl)oxytriacryl zirconate, dineopentyl(diallyl)oxydiparamino benzoyl zirconate, dineopentyl(diallyl)oxydi(3-mercapto)propionic zirconate, 2,2-dimethyl1,3propanediolatobis(dioctyl)pyrophosphato-O (adduct) 2 moles N,N-dimethylamino-alkyl propenoamide zirconate, (2-ethyl,2-propanolatomethyl)1,3-propanediolato cyclobis2-dimethylamino pyrophosphato-O,O adduct with 2 moles of methanesulfonic acid zirconate, tetrakis2,2(bis-2-propenolatomethyl)butanolato, adduct with 2 moles of ditridecyl hydrogen phosphite zirconate, 2-ethyl2-propenolatomethyl1,3-propanoediolato cyclodi2,2-(bis-2-propenolatomethyl)butanolato pyrophosphato-O,O bis2-ethylhexanolato cyclo(di-2-ethylhexyl)pyrophosphato zirconate, 2,2(bis-2-propenolatomethyl)butanolatotrisneodecanoato-O zirconate, 2,2(bis-2-propenolatomethyl)butanolatotris(dodecyl)benzenesulfonato-O zirconate, 2,2(bis-2-propenolatomethyl)butanolatotris(dioctyl)phosphato-O, 2,2(bis-2-propenolatomethyl)butanolatotris(dioctyl) phosphato-O zirconate, 2,2(bis-2-propenolatomethyl)butanolatotris2-methyl-2-propenato-O zirconate, 2,2(bis-2propenolatomethyl)butanolatotris(dioctyl)pyrophosphato-O zirconate, 2,2(bis-2-propenolatomethyl)butanolato pyrophosphato-O,O zirconate, 2,2(bis-2-propenolato butanolatotri2-propenolato-O, 2,2 (bis-2-propenolatomethyl)butanolatotri(2-ethylenediamino)ethylato zirconate, bis2,2(bis-2-propenolatomethyl)butanolatobis(para amino benzoato-O)zirconate, bis2,2(bis-2-propenolatomethyl)butanolatobis(3-mercapto) propionato-O zirconate, 1,1(bis-2-propenolatomethyl)butanolatotris(2-amino)phenylato zirconate, and mixtures thereof.

The preferred organo-metallic zirconium compound for use as the compatibilizer of the present invention is cyclo [dineopentyl(diallyl)]pyrophosphato dineopentyl(diallyl)zirconate (also known as cyclo[bis-(2,2-diallyoxymethyl)butylpyrophosphato bis-(2,2-diallyloxymethyl)butyl zirconate, also known as Zirconium IV di[2,2-(bis2-propenoclatomethyl)butanolato]cyclodi[2,2-(bis2-propenoclatomethyl)butanolato]pyrophosphato-O,O,(CAS # 121543-39-3)), also known as KZ TPP. KZ TPP is commercially available from Kenrich Petrochemicals under the designation KEN-REACT KZTPP.

The compatibilizing agents employed in the practice of the present invention can be incorporated into the composite in any of several ways. For example, the agent can first be mixed with the PVC and then the natural fiber can be added to the mixture. Alternatively, the agent can first be mixed with the natural fiber and then the PVC can be added to the mixture. In another alternative, the PVC and the natural fiber are first blended together and then the agent is added to the blend. In still another alternative, all three components are mixed together simultaneously, as, for example, in an extruder.

As employed herein, the term poly(vinyl chloride), or PVC, is intended to include both homopolymers and copolymers of vinyl chloride, i.e., vinyl resins containing vinyl chloride units in their structure, e.g., copolymers of vinyl chloride and vinyl esters of aliphatic acids, in particular vinyl acetate; copolymers of vinyl chloride with esters of acrylic and methacrylic acid and with acrylonitrile; copolymers of vinyl chloride with diene compounds and unsaturated dicarboxylic acids or anhydrides thereof, such as copolymers of vinyl chloride with diethyl maleate, diethyl fumarate or maleic anhydride; post-chlorinated polymers and copolymers of vinyl chloride; copolymers of vinyl chloride and vinylidene chloride with unsaturated aldehydes, ketones and others, such as acrolein, crotonaldehyde, vinyl methyl ketone, vinyl methyl ether, vinyl isobutyl ether, and the like.

The term "PVC" as employed herein is also intended to include graft polymers of PVC with EVA, ABS, and MBS. Preferred substrates are also mixtures of the above-mentioned homopolymers and copolymers, in particular vinyl chloride homopolymers, with other thermoplastic and/or elastomeric polymers, in particular blends with ABS, MBS, NBR, SAN, EVA, CPE, MBAS, PMA, PMMA, EPDM, and polylactones.

Within the scope of this invention, PVC will also be understood to include recyclates of halogen-containing polymers, which are the polymers described above in more detail and which have suffered damage by processing, use or storage. PVC recyclate is particularly preferred. The recyclates may also contain minor amounts of foreign materials, typically paper, pigments, adhesives or other polymers, which are often difficult to remove. These foreign materials can also originate from contact with different substances during use or working up, for example fuel residues, paint components, metal traces, initiator residues, and water traces.

The primary requirement for the PVC material is that it retain sufficient thermoplastic properties to permit flux melt blending with wood and other natural fibers, permit formation of linear extrudate pellets, and to permit the composition material or pellet to be extruded or injection molded in a thermoplastic process forming a rigid structural member. PVC homopolymers, copolymers, and polymer alloys are available from a number of manufacturers including B.F. Goodrich, Vista, Air Products, Occidental Chemicals, etc. Preferred poly(vinyl chloride) materials are PVC homopolymers having molecular weights of about 10,000 to 250,000, preferably about 20,000 to 90,000.

Suitable biofibers for use in the practice of the present invention may be derived from any of a number of available sources, such as ground wood, sawdust, wood flour, ground newsprint, magazines, books, cardboard, wood pulps (mechanical, stone ground, chemical, mechanical-chemical, refined, bleached or unbleached, virgin or recycled, sludge, waste fines), and various agricultural wastes (rice hulls, wheat, oat, barley and oat chaff, coconut shells, peanut shells, walnut shells, straw, corn husks, corn stalks, jute, hemp, bagasse, bamboo, flax, and kenaf).

Wood fiber, which is preferred because of its abundance and suitability can be derived from either soft woods or evergreens or from hard woods commonly known as broad leaf deciduous trees. Soft woods are generally preferred for fiber manufacture because the resulting fibers are longer and contain higher percentages of lignin and lower percentages of hemicellulose than hard woods. While soft wood is the primary source of fiber for use in the practice of the present invention, additional fiber make-up can be derived from a number of secondary or fiber reclaim sources, including bamboo, rice, sugar cane, flex, kenaf, and recycled fibers from newspapers, boxes, computer printouts, and the like.

A preferred source for wood fiber comprises the wood fiber by-product of sawing or milling soft woods commonly known as sawdust or milling tailings. Such wood fiber has a regular reproducible shape and aspect ratio. The fibers are commonly at least 0.1 mm in length, at least 0.01 mm in thickness and commonly have an aspect ratio of at least 1.8. Preferably, the fibers are 0.2 to 10 mm in length, 0.02 to 1.5 mm in thickness with an aspect ratio between 2 and 7, preferably 2.5 to 6.0. The preferred fiber is derived from processes common in the manufacture of windows and doors. Wooden members are commonly ripped or sawed to size in a cross grain direction to form appropriate lengths and widths of wood materials. The by-product of such sawing operations is a substantial quantity of sawdust. In shaping a regular shaped piece of wood into a useful milled shape, wood is commonly passed through machines that selectively remove wood from the piece leaving the useful shape. Such milling operations produce substantial quantities of sawdust or mill tailing by-products. Lastly, when shaped materials are cut to size and mitered joints, butt joints, overlapping joints, mortise and tenon joints are manufactured from pre-shaped wooden members, substantial waste trim is produced. Such large trim pieces are commonly cut and machined to convert the larger objects into wood fiber having dimensions approximating sawdust or mill tailing dimensions. The wood fiber sources can be blended regardless of particle size and used to make the composite. The fiber stream can be pre-sized to a preferred range or can be sized after blending. Further, the fiber can be pre-pelletized before use in composite manufacture.

The poly(vinyl chloride) and cellulose fiber can be combined and formed into pellets using, for example, thermoplastic extrusion processes, and the fiber can be introduced into the pellet making process in a number of sizes. Preferably, wood fiber should have a minimum size of length and width of at least about 1 mm because wood flour tends to be explosive at certain wood to air ratios. Further, wood fiber of appropriate size of an aspect ratio greater than 1 tends to increase the physical properties of the extruded structural member. However, useful structural members can be made with fibers of very large size. Fibers that are up to 3 cm in length and 0.5 cm in thickness can be used as input to the pellet or linear extrudate manufacture process. However, particles of this size do not produce the highest quality structural members or maximized structural strength. Further, large particle wood fibers can be reduced in size by grinding or other similar processes that produce a fiber similar to sawdust having the stated dimensions and aspect ratio. One further advantage of manufacturing sawdust of the desired size is that the material can be pre-dried before introduction into the pellet or linear extrudate manufacturing process. Further, wood fiber can be pre-pelletized into pellets of wood fiber with small amounts of binder if necessary.

During the pelletizing process for the composite pellet, the PVC and fiber are intimately contacted at high temperatures and pressures to ensure that the fiber and polymeric material are wetted, mixed, and extruded in a form such that the polymer material, on a microscopic basis, coats and flows into the pores, cavities, etc., of the fibers. The fibers are preferably substantially oriented by the extrusion process in the extrusion direction. Such substantial orientation causes the overlapping of adjacent parallel fibers and the polymeric coating of the oriented fibers, resulting in a material useful for the manufacture of improved structural members having improved physical properties. The degree of orientation is typically about 20%, preferably 30% above random orientation, which is about 45 to 50%, said orientation being percents above the normal orientation.

Moisture control is an important element of manufacturing a useful linear extrudate or pellets. Depending on the equipment used and processing conditions, control of the water content of the linear extrudate or pellet can be important in forming a successful structural member substantially free of internal voids or surface blemishes. The concentration of water present in sawdust during the formation of pellets or linear extrudate when heated can flash from the surface of a newly extruded structural member and can come as a result of a rapid volatilization, form a steam bubble deep in the interior of the extruded member that can pass from the interior through the hot thermoplastic extrudate leaving a substantial flaw. In a similar fashion, surface water can bubble and leave cracks, bubbles, or other surface flaws in the extruded member.

Because of the variation in water content of wood fiber sources and the sensitivity of extrudate to water content, control of water to a level of less than 8 weight percent in the pellet based on pellet weight can be important. When structural members are extruded in a non-vented extrusion process, the pellet should be as dry as possible and have a water content between about 0.01 and about 5 weight %, preferably less than 1 weight %. When using vented equipment in manufacturing the extruded linear member, a water content of less than about 8 weight % can be tolerated if processing conditions are such that the vented extrusion equipment can dry the thermoplastic material prior to the final formation of the structural member at the extrusion head. The pellets or linear extrudate of the invention can be made by extrusion of the PVC and fiber composite through an extrusion die resulting in a linear extrudate that can be cut into a pellet shape. The pellet cross-section can be any arbitrary shape depending on the extrusion die geometry.

Depending on their end use requirement, the compositions employed in the practice of the present invention can also contain further additives and stabilizers, typically potassium, sodium, calcium, magnesium, and barium soaps or tin derivatives as well as, inter alia, process aids, fusion promoters, plasticizers, epoxide compounds, metal perchlorates, lubricants, waxes, impact modifiers, fillers, reinforcing agents, antioxidants, polyols, polyethyleneglycols, dawsonites, hydrotalcites, organic phosphites, 1,3-diketo compounds, mono-, oligo- or polymeric dihydropyridines, uracil derivatives, hydroxylamines, sterically hindered amines (HALS), light stabilizers, UV absorbers, fatty acid esters, paraffins, blowing agents, fluorescent whitening agents, fillers, pigments, flame retardants, antistatic agents, aminocrotonates, thiophosphates, gelling assistants, metal deactivators, peroxide scavenging compounds, modifiers and further sequestrants for Lewis acids and the like, as is known in the art. See, for example, U.S. Pat. No. 6,531,533, the disclosure of which is incorporated herein by reference in its entirety. Preferred additives are selected from the group consisting of heat stabilizers, lubricants, impact modifiers, processing aids, antioxidants, fillers, pigments, and mold release agents.

Where fusion promoters, process aids, and lubricants are included in the composites of the present invention, they can be, but are not limited to, calcium stearate, montan wax, fatty acid esters, polyethylene waxes, chlorinated polyethylene, chlorinated hydrocarbons, oxidized polyethylene, methyl methacrylate-styrene-acrylonitrile resin, glycerol esters, combinations thereof, and the like. Where impact modifiers are included in the composites of the present invention, they can be, but not limited to, for example, chlorinated polyolefins such as chlorinated polyethylene, EVA copolymers, acrylic or modified acrylic resins, MBS copolymers, MABS copolymers, calcium carbonate, alumina trihydrate, combinations thereof, and the like. Where fillers are included in the composites of the present invention, they can be, but are not limited to, calcium carbonate, talc, calcined kaolin, mica, feldspar, wollastonite, silica, glass, barite, calcium sulfate, titanium dioxide, combinations thereof, and the like.

Various features and aspects of the present invention are illustrated further in the examples that follow. While these examples are presented to show one skilled in the art how to operate within the scope of the invention, they are not intended in any way to serve as a limitation upon the scope of the invention.

EXAMPLES

KZ TPP was used in thermoplastic composites (wood flour—PVC) as a compatibilizer that was added at the compounding step. The material was used as both a single compatibilizer and in combinations with other known compatibilizers, such as linoleic acid and epoxy resins.

KZ TPP was added either as a 95% active technically pure liquid or a 65% active solid material supported on silica (35 wt. %) (KZ TPP/H). The composite was based on wood flour and PVC or on cellulose fiber and PVC, and contained other appropriate additives, such as lubricants, heat stabilizers, process aids, fusion promoters, impact modifiers, etc. The dry blended compounds were prepared using a high shear Papenmeier mixer, then processed either via extrusion using a twin screw extruder, or milled in a two-roll mill and compression molded.

The composite specimens were then tested for flexural strength and flexural modulus. Specifically, two PVC formulations were used for making the composites, the difference between the two of them being the kind of lubricants used. Formulation 1 included calcium stearate as a lubricant, whereas Formulation 2 did not. Pine flour used was 4020 pine wood flour (40 mesh) from American Wood Fibers. Cellulose fibers used were Createch TC 750, a commercial product from Creafill Fibers Corp. (Chestertown, Md.). Both the wood flour and the fibers were dried in a circulating oven at 80° C. for three days before use. The resulting moisture content was less than 1%. The ratio of wood flour (or cellulose fibers) to PVC compound was 40/60. Specimens were tested according to ASTM D 790-92.

It was shown that addition of KZTPP/H at 0.5-0.75% of wood (or 0.2-0.3% of the composite weight) increased both the strength and modulus characteristics by about 6-13%.

TABLE 1

Flexural Properties of Pine Flour/PVC Composites*

| Compatibilizer | Compatibilizer loading | | | Processing type | Peak Stress, psi | Modulus, psi |
|---|---|---|---|---|---|---|
| | phr | % of wood | % of total | | | |
| None | — | — | — | Extrusion | 11,204 | 1,084,855 |
| KZ TPP/H | 0.38 | 0.50 | 0.20 | Extrusion | 12,301 | 1,181,151 |
| None | — | — | — | Compression Molding | 10,384 | 928,747 |
| KZ TPP/H | 0.38 | 0.50 | 0.20 | Compression Molding | 10,997 | 1,023,822 |

*Formulation contained calcium stearate.

TABLE 2

Flexural Properties of Extruded Cellulose Fiber/PVC Composites

| Formulation* | Compatibilizer | Compatibilizer Loading, phr | Peak Stress, psi | Modulus, psi |
|---|---|---|---|---|
| 1 | None | — | 8,423 | 718,204 |
| 1 | KZ TPP/H | 0.40 | 8,899 | 775,277 |
| 2 | None | — | 8,699 | 725,142 |
| 2 | KZ TPP/H | 0.40 | 9,129 | 771,607 |

*Formulation 2 did not contain calcium stearate.

In view of the many changes and modifications that can be made without departing from principles underlying the invention, reference should be made to the appended claims for an understanding of the scope of the protection to be afforded the invention.

What is claimed is:

1. A method for improving the physical properties of cellulose fiber-containing material/PVC composites comprising adding to said composites 0.1 to 90 phr of at least one compatibilizer comprising an organometallic zirconium compound.

2. The method of claim 1 wherein the organometallic zirconium compound is selected from the group consisting of:
cyclo[dineopentyl(diallyl)]pyrophosphato dineopentyl(diallyl)zirconate,
cyclo(dioctyl)pyrophosphato dioctyl zirconate,
cycloneopentyl cyclo(dimethylaminoethyl)pyrophosphate zirconate dimesyl salt,
tetra(2,2diallyloxymethyl)butyl di(ditridecyl)phosphito zirconate,
neopentyl(diallyl)oxytrineodecanoyl zirconate,
neopentyl(diallyl)oxytri(dodecyl)benzene sulfonyl zirconate,
neopentyl(diallyl)oxytri(dioctyl)phosphato zirconate,
neopentyl(diallyl)oxytri(dioctyl)pyrophosphato zirconate,
neopentyl(diallyl)oxytri(N-ethylenediamino)ethyl zirconate,
neopentyl(diallyl)oxytri-(m-amino)phenyl zirconate,
neopentyl(diallyl)oxytrimethylacryl zirconate,
neopentyl(diallyl)oxytriacryl zirconate,
dineopentyl(diallyl)oxydiparamino benzoyl zirconate,
dineopentyl(diallyl)oxydi(3-mercapto)propionic zirconate,
2,2-dimethyl1,3propanediolatobis(dioctyl)pyrophosphato-O (adduct) 2 moles N,N-dimethylamino-alkyl propenoamide zirconate,
(2-ethyl,2-propanolatomethyl)1,3-propanediolato cyclobis2-dimethylamino pyrophosphato-O,O adduct with 2 moles of methanesulfonic acid zirconate,
tetrakis2,2(bis-2-propenolatomethyl)butanolato, adduct with 2 moles of ditridecyl hydrogen phosphite zirconate,
2-ethyl2-propenolatomethyl1,3-propanoediolato cyclodi2,2-(bis-2-propenolatomethyl)butanolato pyrophosphato-O,O bis2-ethylhexanolato cyclo(di-2-ethylhexyl)pyrophosphato zirconate,
2,2(bis-2-propenolatomethyl)butanolatotrisneodecanoato-O zirconate,
2,2(bis-2-propenolatomethyl)butanolatotris(dodecyl)benzenesulfonato-O zirconate,
2,2(bis-2-propenolatomethyl)butanolatotris(dioctyl)phosphato-O, 2,2(bis-2-propenolatomethyl)butanolatotris(dioctyl)phosphato-O zirconate,
2,2(bis-2-propenolatomethyl)butanolatotris2-methyl-2-propenato-O zirconate, 2,2(bis-2-propenolatomethyl)butanolatotris(dioctyl)pyrophosphato-O zirconate,
2,2(bis-2-propenolatomethyl)butanolato pyrophosphato-O,O zirconate,
2,2(bis-2-propenolato butanolatotri2-propenolato-O, 2,2(bis-2-propenolatomethyl)butanolatotri(2-ethylenediamino)ethylato zirconate,
bis2,2(bis-2-propenolatomethyl)butanolatobis(para amino benzoato-O)zirconate,
bis2,2(bis-2-propenolatomethyl)butanolatobis(3-mercapto) propionato-O zirconate,
1,1(bis-2-propenolatomethyl)butanolatotris(2-amino) phenylato zirconate, and mixtures thereof.

3. The method of claim 2 wherein the organometallic zirconium compound is cyclo[dineopentyl(diallyl)]pyrophosphato dineopentyl(diallyl)zirconate.

4. The method of claim 1 wherein the cellulose fiber-containing material is selected from the group consisting of wood flour, wood fiber, refined cellulose fiber, virgin or recycled, flax, rice hulls, sisal, jute, and kenaf.

5. The method of claim 4 wherein the organometallic zirconium compound is selected from the group consisting of:
cyclo[dineopentyl(diallyl)]pyrophosphato dineopentyl(diallyl)zirconate,
cyclo(dioctyl)pyrophosphato dioctyl zirconate,
cycloneopentyl cyclo(dimethylaminoethyl)pyrophosphate zirconate dimesyl salt, tetra(2,2diallyloxymethyl)butyl di(ditridecyl)phosphito zirconate,
neopentyl(diallyl)oxytrineodecanoyl zirconate,
neopentyl(diallyl)oxytri(dodecyl)benzene sulfonyl zirconate,
neopentyl(diallyl)oxytri(dioctyl)phosphato zirconate,
neopentyl(diallyl)oxytri(dioctyl)pyrophosphato zirconate,
neopentyl(diallyl)oxytri(N-ethylenediamino)ethyl zirconate,
neopentyl(diallyl)oxytri-(m-amino)phenyl zirconate,
neopentyl(diallyl)oxytrimethylacryl zirconate,
neopentyl(diallyl)oxytriacryl zirconate,
dineopentyl(diallyl)oxydiparamino benzoyl zirconate,
dineopentyl(diallyl)oxydi(3-mercapto)propionic zirconate,
2,2-dimethyl1,3propanediolatobis(dioctyl)pyrophosphato-O (adduct) 2 moles N,N-dimethylamino-alkyl propenoamide zirconate,
(2-ethyl,2-propanolatomethyl)1,3-propanediolato cyclobis2-dimethylamino pyrophosphato-O,O adduct with 2 moles of methanesulfonic acid zirconate,
tetrakis2,2(bis-2-propenolatomethyl)butanolato, adduct with 2 moles of ditridecyl hydrogen phosphite zirconate,
2-ethyl2-propenolatomethyl1,3-propanoediolato cyclodi2,2-(bis-2-propenolatomethyl)butanolato pyrophosphato-O,O bis2-ethylhexanolato cyclo(di-2-ethylhexyl)pyrophosphato zirconate,
2,2(bis-2-propenolatomethyl)butanolatotrisneodecanoato-O zirconate,
2,2(bis-2-propenolatomethyl)butanolatotris(dodecyl)benzenesulfonato-O zirconate,
2,2(bis-2-propenolatomethyl)butanolatotris(dioctyl)phosphato-O 2,2(bis-2-propenolatomethyl)butanolatotris(dioctyl)phosphato-O zirconate,
2,2(bis-2-propenolatomethyl)butanolatotris2-methyl-2-propenato-O zirconate, 2,2(bis-2-propenolatomethyl)butanolatotris(dioctyl)pyrophosphato-O zirconate,
2,2(bis-2-propenolatomethyl)butanolato pyrophosphato-O,O zirconate,
2,2(bis-2-propenolato butanolatotri2-propenolato-O, 2,2(bis-2-propenolatomethyl)butanolatotri(2-ethylenediamino)ethylato zirconate,
bis2,2(bis-2-propenolatomethyl)butanolatobis(para amino benzoato-O)zirconate,
bis2,2(bis-2-propenolatomethyl)butanolatobis(3-mercapto) propionato-O zirconate,
1,1(bis-2-propenolatomethyl)butanolatotris(2-amino) phenylato zirconate, and mixtures thereof.

6. The method of claim 5 wherein the organometallic zirconium compound is cyclo[dineopentyl(diallyl)]pyrophosphato dineopentyl(diallyl)zirconate.

7. The method of claim 1 wherein the composites further comprise at least one additive selected from the group consisting of heat stabilizers, lubricants, impact modifiers, processing aids, antioxidants, fillers, pigments, and mold release agents.

8. The method of claim 7 wherein the organometallic zirconium compound is selected from the group consisting of:
cyclo[dineopentyl(diallyl)]pyrophosphato dineopentyl(diallyl)zirconate,
cyclo(dioctyl)pyrophosphato dioctyl zirconate,
cycloneopentyl cyclo(dimethylaminoethyl)pyrophosphate zirconate dimesyl salt, tetra(2,2diallyloxymethyl)butyl di(ditridecyl)phosphito zirconate,
neopentyl(diallyl)oxytrineodecanoyl zirconate,
neopentyl(diallyl)oxytri(dodecyl)benzene sulfonyl zirconate,
neopentyl(diallyl)oxytri(dioctyl)phosphato zirconate,
neopentyl(diallyl)oxytri(dioctyl)pyrophosphato zirconate,
neopentyl(diallyl)oxytri(N-ethylenediamino)ethyl zirconate,
neopentyl(diallyl)oxytri-(m-amino)phenyl zirconate,
neopentyl(diallyl)oxytrimethylacryl zirconate,
neopentyl(diallyl)oxytriacryl zirconate,
dineopentyl(diallyl)oxydiparamino benzoyl zirconate,
dineopentyl(diallyl)oxydi(3-mercapto)propionic zirconate,
2,2-dimethyl1,3propanediolatobis(dioctyl)pyrophosphato-O (adduct) 2 moles N,N-dimethylamino-alkyl propenoamide zirconate,
(2-ethyl,2-propanolatomethyl)1,3-propanediolato cyclobis2-dimethylamino pyrophosphato-O,O adduct with 2 moles of methanesulfonic acid zirconate,
tetrakis2,2(bis-2-propenolatomethyl)butanolato, adduct with 2 moles of ditridecyl hydrogen phosphite zirconate,
2-ethyl2-propenolatomethyl1,3-propanoediolato cyclodi2,2-(bis-2-propenolatomethyl)butanolato pyrophosphato-O,O bis2-ethylhexanolato cyclo(di-2-ethylhexyl)pyrophosphato zirconate,
2,2(bis-2-propenolatomethyl)butanolatotrisneodecanoato-O zirconate,
2,2(bis-2-propenolatomethyl)butanolatotris(dodecyl)benzenesulfonato-O zirconate,
2,2(bis-2-propenolatomethyl)butanolatotris(dioctyl)phosphato-O, 2,2(bis-2-propenolatomethyl)butanolatotris(dioctyl)phosphato-O zirconate,
2,2(bis-2-propenolatomethyl)butanolatotris2-methyl-2-propenato-O zirconate, 2,2(bis-2-propenolatomethyl)butanolatotris(dioctyl)pyrophosphato-O zirconate,
2,2(bis-2-propenolatomethyl)butanolato pyrophosphato-O,O zirconate,
2,2(bis-2-propenolato butanolatotri2-propenolato-O, 2,2(bis-2-propenolatomethyl)butanolatotri(2-ethylenediamino)ethylato zirconate,
bis2,2(bis-2-propenolatomethyl)butanolatobis(para amino benzoato-O)zirconate,
bis2,2(bis-2-propenolatomethyl)butanolatobis(3-mercapto) propionato-O zirconate,
1,1(bis-2-propenolatomethyl)butanolatotris(2-amino) phenylato zirconate, and mixtures thereof.

9. The method of claim 8 wherein the organometallic zirconium compound is cyclo[dineopentyl(diallyl)]pyrophosphato dineopentyl(diallyl)zirconate.

10. A composition comprising a cellulose fiber-containing material/PVC composite and 0.1 to 90 phr of at least one compatibilizer comprising an organometallic zirconium compound.

11. The composition of claim 10 wherein the organometallic zirconium compound is selected from the group consisting of:
cyclo[dineopentyl(diallyl)]pyrophosphato dineopentyl(diallyl)zirconate,
cyclo(dioctyl)pyrophosphato dioctyl zirconate,
cycloneopentyl cyclo(dimethylaminoethyl)pyrophosphate zirconate dimesyl salt,
tetra(2,2diallyloxymethyl)butyl di(ditridecyl)phosphito zirconate,
neopentyl(diallyl)oxytrineodecanoyl zirconate,
neopentyl(diallyl)oxytri(dodecyl)benzene sulfonyl zirconate,
neopentyl(diallyl)oxytri(dioctyl)phosphato zirconate,
neopentyl(diallyl)oxytri(dioctyl)pyrophosphato zirconate,
neopentyl(diallyl)oxytri(N-ethylenediamino)ethyl zirconate,
neopentyl(diallyl)oxytri-(m-amino)phenyl zirconate,
neopentyl(diallyl)oxytrimethylacryl zirconate,
neopentyl(diallyl)oxytriacryl zirconate,
dineopentyl(diallyl)oxydiparamino benzoyl zirconate,
dineopentyl(diallyl)oxydi(3-mercapto)propionic zirconate,
2,2-dimethyl1,3propanediolatobis(dioctyl)pyrophosphato-O (adduct) 2 moles N,N-dimethylamino-alkyl propenoamide zirconate,
(2-ethyl,2-propanolatomethyl)1,3-propanediolato cyclobis2-dimethylamino pyrophosphato-O,O adduct with 2 moles of methanesulfonic acid zirconate,
tetrakis2,2(bis-2-propenolatomethyl)butanolato, adduct with 2 moles of ditridecyl hydrogen phosphite zirconate,
2-ethyl2-propenolatomethyl1,3-propanoediolato cyclodi2,2-(bis-2-propenolatomethyl)butanolato pyrophosphato-O,O bis2-ethylhexanolato cyclo(di-2-ethylhexyl)pyrophosphato zirconate,
2,2(bis-2-propenolatomethyl)butanolatotrisneodecanoato-O zirconate,
2,2(bis-2-propenolatomethyl)butanolatotris(dodecyl)benzenesulfonato-O zirconate,
2,2(bis-2-propenolatomethyl)butanolatotris(dioctyl)phosphato-O, 2,2(bis-2-propenolatomethyl)butanolatotris(dioctyl)phosphato-O zirconate,
2,2(bis-2-propenolatomethyl)butanolatotris2-methyl-2-propenato-O zirconate, 2,2(bis-2-propenolatomethyl)butanolatotris(dioctyl)pyrophosphato-O zirconate,
2,2(bis-2-propenolatomethyl)butanolato pyrophosphato-O,O zirconate,
2,2(bis-2-propenolato butanolatotri2-propenolato-O, 2,2(bis-2-propenolatomethyl)butanolatotri(2-ethylenediamino)ethylato zirconate,
bis2,2(bis-2-propenolatomethyl)butanolatobis(para amino benzoato-O)zirconate,
bis2,2(bis-2-propenolatomethyl)butanolatobis(3-mercapto) propionato-O zirconate,
1,1(bis-2-propenolatomethyl)butanolatotris(2-amino) phenylato zirconate, and mixtures thereof.

12. The composition of claim 11 wherein the organometallic zirconium compound is cyclo[dineopentyl(diallyl)]pyrophosphato dineopentyl(diallyl)zirconate.

13. The composition of claim 10 wherein the cellulose fiber-containing material is selected from the group consisting of wood flour, wood fiber, refined cellulose fiber, virgin or recycled, flax, rice hulls, sisal, jute, and kenaf.

14. The composition of claim 10 wherein the composites further comprise at least one additive selected from the group consisting of heat stabilizers, lubricants, impact modifiers, processing aids, antioxidants, fillers, pigments, and mold release agents.

15. An article of manufacture comprising a composition comprising a cellulose fiber-containing material/PVC composite and 0.1 to 90 phr of at least one compatibilizer comprising an organometallic zirconium compound.

16. The article of claim 15 wherein the organometallic zirconium compound is selected from the group consisting of:
cyclo[dineopentyl(diallyl)]pyrophosphato dineopentyl(diallyl)zirconate,
cyclo(dioctyl)pyrophosphato dioctyl zirconate, cycloneopentyl cyclo(dimethylaminoethyl)pyrophosphate zirconate dimesyl salt,
tetra(2,2diallyloxymethyl)butyl di(ditridecyl)phosphito zirconate,
neopentyl(diallyl)oxytrineodecanoyl zirconate,
neopentyl(diallyl)oxytri(dioctyl)phosphato zirconate,
neopentyl(diallyl)oxytri(dioctyl)pyrophosphato zirconate,
neopentyl(diallyl)oxytri(N-ethylenediamino)ethyl zirconate,
neopentyl(diallyl)oxytri-(m-amino)phenyl zirconate,
neopentyl(diallyl)oxytrimethylacryl zirconate,
neopentyl(diallyl)oxytriacryl zirconate,
dineopentyl(diallyl)oxydiparamino benzoyl zirconate,
dineopentyl(diallyl)oxydi(3-mercapto)propionic zirconate,
2,2-dimethyl1,3propanediolatobis(dioctyl)pyrophosphato-O (adduct) 2 moles N,N-dimethylamino-alkyl propenoamide zirconate,
(2-ethyl,2-propanolatomethyl)1,3-propanediolato cyclobis2-dimethylamino pyrophosphato-O,O adduct with 2 moles of methanesulfonic acid zirconate,
tetrakis2,2(bis-2-propenolatomethyl)butanolato, adduct with 2 moles of ditridecyl hydrogen phosphite zirconate,
2-ethyl2-propenolatomethyl1,3-propanoediolato cyclodi2,2-(bis-2-propenolatomethyl)butanolato pyrophosphato-O,O bis2-ethylhexanolato cyclo(di-2-ethylhexyl)pyrophosphato zirconate,
2,2(bis-2-propenolatomethyl)butanolatotrisneodecanoato-O zirconate,
2,2(bis-2-propenolatomethyl)butanolatotris(dodecyl)benzenesulfonato-O zirconate,
2,2(bis-2-propenolatomethyl)butanolatotris(dioctyl)phosphato-O, 2,2(bis-2-propenolatomethyl)butanolatotris(dioctyl)phosphato-O zirconate,
2,2(bis-2-propenolatomethyl)butanolatotris2-methyl-2-propenato-O zirconate, 2,2(bis-2-propenolatomethyl)butanolatotris(dioctyl)pyrophosphato-O zirconate,
2,2(bis-2-propenolatomethyl)butanolato pyrophosphato-O zirconate,
2,2(bis-2-propenolato butanolatotri2-propenolato-O, 2,2(bis-2-propenolatomethyl)butanolatotri(2-ethylenediamino)ethylato zirconate,
bis2,2(bis-2-propenolatomethyl)butanolatobis(para amino benzoato-O)zirconate,
bis2,2(bis-2-propenolatomethyl)butanolatobis(3-mercapto) propionato-O zirconate,
1,1(bis-2-propenolatomethyl)butanolatotris(2-amino) phenylato zirconate, and mixtures thereof.

17. The article of claim 16 wherein the organometallic zirconium compound is cyclo[dineopentyl(diallyl)]pyrophosphato dineopentyl(diallyl)zirconate.

18. The article of claim 15 wherein the cellulose fiber-containing material is selected from the group consisting of wood flour, wood fiber, refined cellulose fiber, virgin or recycled, flax, rice hulls, sisal, jute, and kenaf.

19. The article of claim 15 wherein the composites further comprise at least one additive selected from the group consisting of heat stabilizers, lubricants, impact modifiers, processing aids, antioxidants, fillers, pigments, and mold release agents.

20. The method of claim 1 wherein 0.3 to 15 phr of the organometallic zirconium compound is added to the composite.

21. The method of claim 1 wherein 0.2% to 0.3% weight percent of the organometallic zirconium compound, based on the total weight of the composite, is added to the composite.

22. The composition of claim 10 wherein the compatibilizer comprises 0.3 to 15 phr of the organometallic zirconium.

23. The composition of claim 10 wherein the compatibilizer comprises 0.2% to 0.3% weight percent of the organometallic zirconium compound, based on the total weight of the composite.

24. The article of claim 15 wherein the compatibilizer comprises 0.3 to 15 phr of the organometallic zirconium.

25. The article of claim 15 wherein the compatibilizer comprises 0.2% to 0.3% weight percent of the organometallic zirconium compound, based on the total weight of the composite.

* * * * *